(12) United States Patent  (10) Patent No.: US 8,292,646 B2
Hsu  (45) Date of Patent: Oct. 23, 2012

(54) ELECTRICAL CARD CONNECTOR

(75) Inventor: Kuei-Sang Hsu, New Taipei (TW)

(73) Assignee: Transcendent Electronics Co., Ltd., New Taipei (TW)

( * ) Notice: Subject to any disclaimer, the term of this patent is extended or adjusted under 35 U.S.C. 154(b) by 85 days.

(21) Appl. No.: 13/084,691

(22) Filed: Apr. 12, 2011

(65) Prior Publication Data

US 2012/0208392 A1  Aug. 16, 2012

(30) Foreign Application Priority Data

Feb. 14, 2011  (TW) ................ 00202727 U

(51) Int. Cl.
 *H01R 13/62* (2006.01)
(52) U.S. Cl. ........................ 439/325; 439/331
(58) Field of Classification Search ........ 439/266–270, 439/325–331, 342, 630
See application file for complete search history.

(56) References Cited

U.S. PATENT DOCUMENTS 6,099,337 A  8/2000  Chan
6,786,748 B2 *  9/2004  Masson et al. ............... 439/188
7,866,988 B2 *  1/2011  Shimada .................... 439/76.1

FOREIGN PATENT DOCUMENTS

| TW | M291118 | 5/2006 |
| TW | M345390 | 11/2008 |
| TW | M390561 | 10/2010 |

* cited by examiner

*Primary Examiner* — Khiem Nguyen
(74) *Attorney, Agent, or Firm* — Ming Chow; Sinorica, LLC

(57) ABSTRACT

An electrical card connector is provided. The electrical card connector includes an insulating body and a cover. Axles of the cover come into contact with pivotal connection slots of the insulating body through flat surfaces, respectively. The axles are prevented from rotating within sliding portions of the pivotal connection slots, respectively, such that the cover cannot be opened while sliding. The axles of the cover come into contact with the pivotal connection slots of the insulating body through curved surfaces, respectively, to reinforce axial strength, increase contact area and friction of the pivotal connection slots, and prevent the axles from being stretched to the detriment of the structural strength of the axles.

4 Claims, 10 Drawing Sheets

ELECTRICAL CARD CONNECTOR

BACKGROUND OF THE INVENTION

1. Field of the Invention

The present invention relates to electrical card connectors, and more particularly, to an electrical card connector capable of enhancing axial strength.

2. Description of the Related Art

With wireless communication technology becoming more sophisticated, products that apply new wireless communication technology are ceaselessly launched into the market, and, among the products, mobile phones are the popular ones. Unlike conventional phones, mobile phones are portable and thus have become an indispensable element in daily life. Mobile phones have two innovative features, namely a Subscriber Identity Module Card (SIM Card) and an electrical card connector. The SIM Card is dedicated to a mobile phone user and configured to process information regarding user identity and data storage. The electrical card connector, which is designed to be installed inside a mobile phone and configured to connect with a SIM Card, is developed in order to facilitate signal transmission between the mobile phone and the SIM Card and enable stable and firm connection between the mobile phone and the SIM Card. Given technological advancement, electronic products have a trend toward miniaturization and multiple functions. A Micro SIM Card, which is of a smaller size than its predecessors, is developed to enable mobile phones to be spacious enough to accommodate electronic components for providing other functions. However, due to the compactness of the Micro SIM Card, the electrical card connector for use with a conventional SIM Card is downsized in order to conform with the size of the Micro SIM Card. However, the downsized electrical card connector is usually flawed with inadequate structure strength, thereby compromising the connection and signal transmission between the Micro SIM Card and the mobile phone.

Taiwan Patent M390561 discloses an electrical card connector comprising an insulating body, conductive terminals, a cover, and a pivotal connection element. The pivotal connection element comprises pivotal connection bases disposed at two ends of one side of the insulating body and pivotal connection portions disposed at two ends of one side of the cover. An axle is disposed at each of the pivotal connection portions. The pivotal connection bases have pivotal connection slots corresponding in position to the axles, respectively, and installation slots in communication with the pivotal connection slots to penetrate the insulating body downward, respectively. The width of a point of communication between the installation slot and the pivotal connection slot is less than the least diameter of the axles. Each of the axles of the cover is of an elliptic cross-section, such that the axles each have a short-axis diameter and a long-axis diameter. The pivotal connection slot has a sliding groove and a pivoting groove.

After the axles of the cover slide to the sliding grooves, the sliding grooves come into contact with the axles through the curved sides at the two ends of the short-axis diameter of the axles, respectively; as a result, the cover and the insulating body fail to cover and abut against a SIM Card tightly, thereby preventing effective electrical connection between the SIM Card and the conductive terminals.

Also, the axles come into contact with the pivoting grooves only through the curved side at one end of the long-axis diameter; as a result, the cover is likely to vibrate. Due to the vibration of the cover, the axles are stretched. Given time, the stretched axles undergo deterioration of structural strength and will eventually sever.

Furthermore, the contact between the axle and the pivoting groove features the transition from one based on the curved sides at the two ends of the short-axis diameter to one based on the curved side at one end of the long-axis diameter. The transition process prevents the cover from sliding steadily.

Accordingly, it is imperative for the related industry to perform research and development (R&D) and make improvements with regard to the aforesaid drawbacks of conventional electrical card connectors, so as to enable users to use electrical card connectors conveniently and efficiently.

BRIEF SUMMARY OF THE INVENTION

To overcome the aforesaid drawbacks of the prior art, the present invention provides an electrical card connector.

The electrical card connector comprises an insulating body, a plurality of conductive terminals, and a cover. Pivotal connection slots are disposed on two sides of the insulating body, respectively, and positioned proximal to one end of the insulating body. The pivotal connection slots each have a sliding portion that comes in the form of an elongated hole and a rotating portion that comes in the form of a round hole. The rotating portion is in communication with the sliding portion. The width of a short side of the sliding portion is less than the diameter of the rotating portion, and a long side of the sliding portion is tangentially connected to the circumference of the rotating portion. The conductive terminals are firmly held in the insulating body. An axle protrudes from each of the two sides of the cover, and the axles are inserted into the pivotal connection slots of the insulating body, respectively. The axles each have a curved portion and a linear portion. The maximum distance from the midpoint of the linear portion to the curved portion is less than the width of the short side of the sliding portion. The radius of curvature of the curved portion is not larger than the radius of the rotating portion.

Hence, it is a primary objective of the present invention to provide an electrical card connector that can be put in a locked state during which the linear portion of each of the axles comes into contact with a long side of the sliding portion through a flat surface, and the curved portion of each of the axles comes into contact with another long side of the sliding portion. As a result, the cover does not have opening room while sliding, and thus the axles are prevented from rotating within the sliding portions of the pivotal connection slots, respectively.

Another objective of the present invention is to provide an electrical card connector that can be put in an unlocked state during which the curved portion and the rotating portion come into contact with each other through a curved surface so as to increase the contact area between the axle and the pivotal connection slot, enhance the ease and stability of rotation of the axles, reduce vibration of the cover so that the cover can be steadily opened, prevent the axles from being stretched to the detriment of the structural strength of the axles, and extend the service life of the electrical card connector.

Yet another objective of the present invention is to provide an electrical card connector, wherein, at the instant of switching the electrical card connector between an unlocked state and a locked state, a long side of the sliding portion is tangentially connected to the circumference of the rotating portion, such that the curved portion can be continuously in contact with the sliding portion or the rotating portion of the pivotal connection slot, so as to enhance the stability of the cover while the cover is sliding.

DETAILED DESCRIPTION OF THE EMBODIMENTS OF THE INVENTION

The present invention discloses an electrical card connector. A Subscriber Identity Module (SIM) for use with the electrical card connector is well known by persons skilled in the related art and thus is not described in detail hereunder. Also, the accompany drawings are illustrative of the structures related to the technical features of the present invention, and thus the accompany drawings are not, and need not be, drawn to scale.

Figure 1:
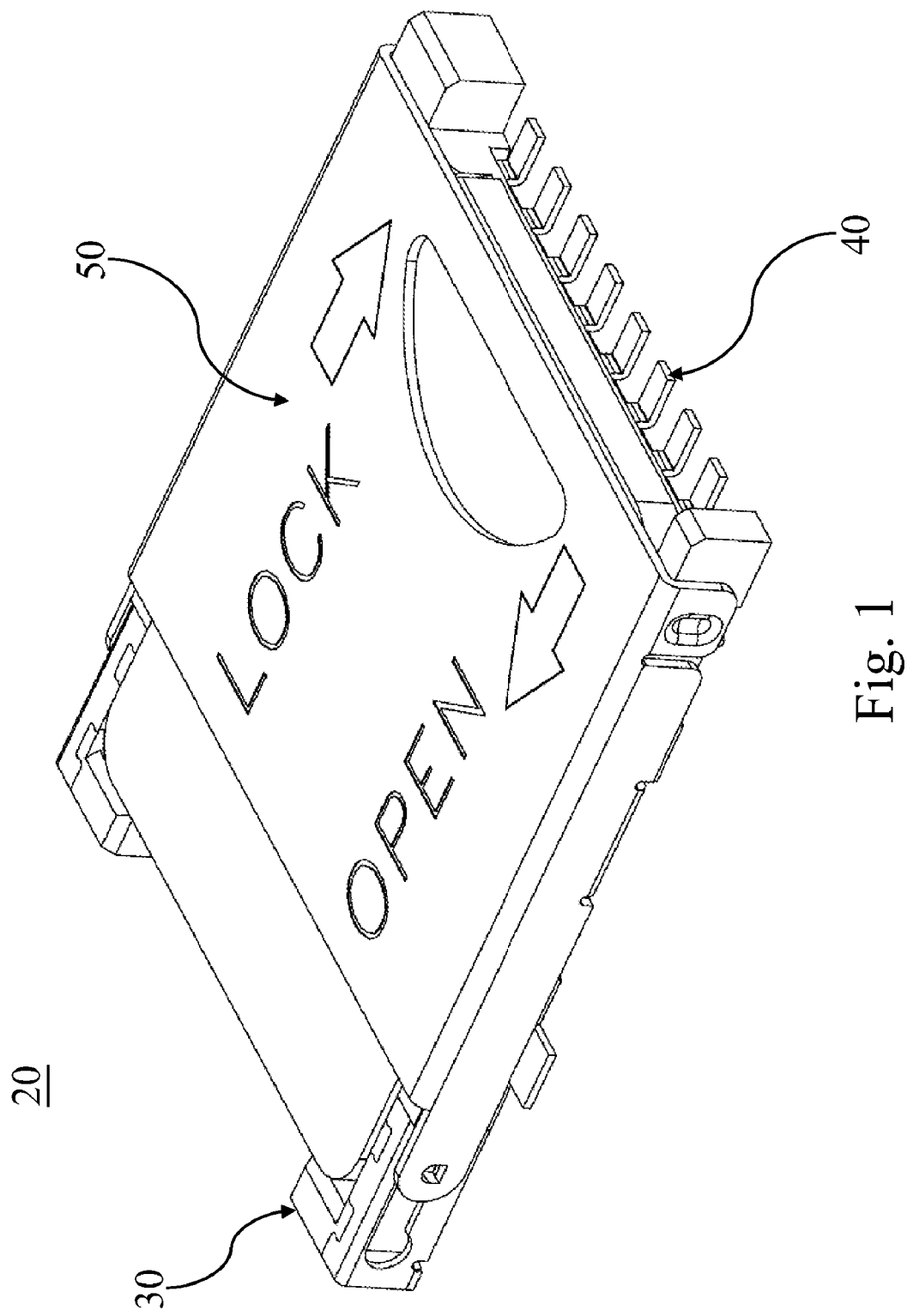
FIG. 1 is a perspective view of an electrical card connector according to a first preferred embodiment of the present invention.

Referring to FIG. 1, there is shown a perspective view of an electrical card connector 20 according to a first preferred embodiment of the present invention. The electrical card connector 20 connects a mobile phone and a Micro SIM Card 10 to effectuate electrical connection therebetween. Alternatively, the electrical card connector 20 of the present invention can come in the same structure but variable dimensions so as to be provided for use with SIM Cards in general, depending on user needs.

The electrical card connector 20 of the present invention comprises an insulating body 30, a plurality of conductive terminals 40, and a cover 50.

Figure 2:
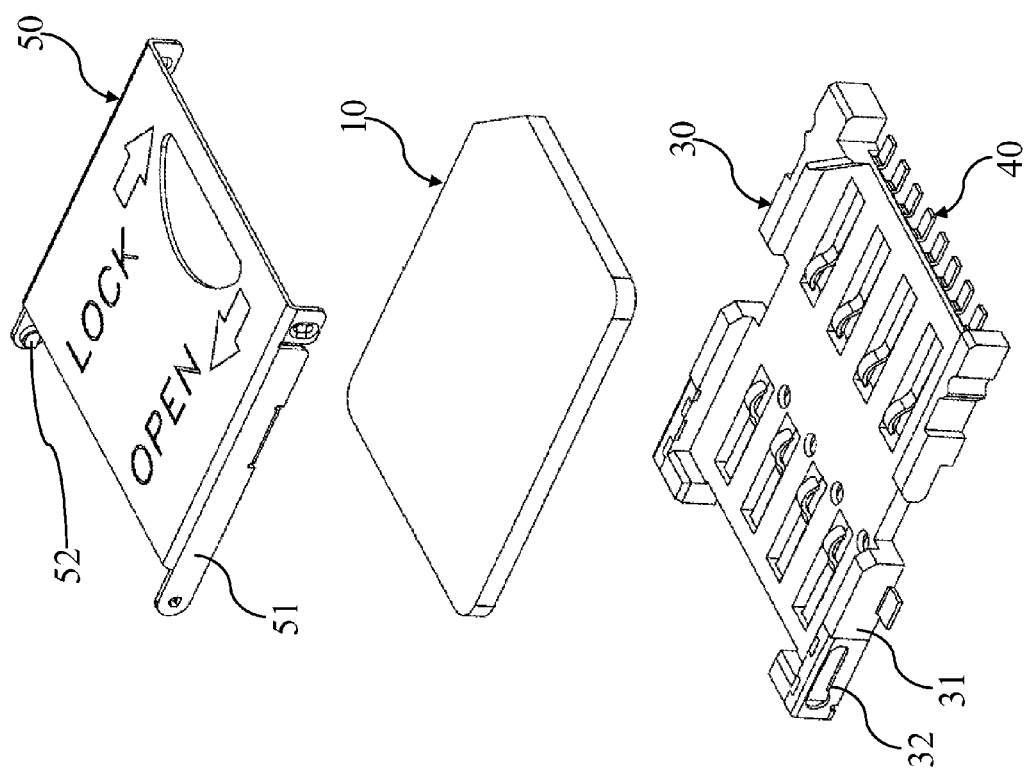
FIG. 2 is an exploded view of the electrical card connector according to the first preferred embodiment of the present invention.

The insulating body 30 (see also FIG. 2 and FIG. 3) is made of an insulating material and is of a U-shaped cross-section. The insulating body 30 bends on two sides thereof to form two side plates 31, respectively. A pivotal connection slot 32 is formed from the insulating body 30 and positioned at one end of each of the two side plates 31. The two pivotal connection slots 32 are opposite to each other. The pivotal connection slots 32 each have a sliding portion 33 and a rotating portion 34. The rotating portion 34 is in communication with one end of the sliding portion 33. The rotating portion 34 is disposed at the end of each of the pivotal connection slots 32. The rotating portions 34 of the pivotal connection slots 32 are round holes, and are each defined by a circumference O of a diameter D. The rotating portion 34 has a radius which equals a half of the diameter D. The sliding portions 33 of the pivotal connection slots 32 are elongated holes. The sliding portions 33 are each defined by two opposing long sides 331 and a short side 332 connected to the two long sides 331. The short side 332 is of a curved shape. The short side 332 is positioned at the other end of the sliding portion 33. The width L of the short side 332 of the sliding portion 33 is less than the diameter D of the rotating portion 34. The two long sides 331 are defined as a first long side 331a and a second long side 331b, respectively. The first long side 331a of the sliding portion 33 is tangentially connected to the circumference O of the rotating portion 34.

The conductive terminals 40 (see FIG. 2) are firmly held in the insulating body 30 by insert molding. The conductive terminals 40 are aligned and spaced apart from each other. The space that separates the conductive terminals 40 from each other depends on the spacing of gold fingers (not shown) of the Micro SIM Card 10.

The cover 50 is made from a metal sheet (see FIGS. 2, 3 and 4), and is of an inverted U-shaped cross-section. The cover 50 bends on two sides thereof to form two side plates 51, respectively. The distance between the two side plates 51 of the cover 50 is larger than the distance between the two side plates 31 of the insulating body 30. An axle 52 is formed from the cover 50 in a manner that the axle 52 protrudes from one end of each of the two side plates 51. The two axles 52 are opposite to each other. The axles 52 each have a curved portion 53 and a linear portion 54. The two end points of the curved portion 53 are connected to the two end points of the linear portion 54, respectively. A midpoint is between the two end points of the linear portion 54. The maximum distance between the midpoint of the linear portion 54 and the curved portion 53 is less than the width L of the short side 332 of the sliding portion 33. As a result, the axles 52 can be inserted into the sliding portions 33 of the pivotal connection slots 32 and slid within the sliding portions 33 in a linear manner, respectively. The radius of curvature of the curved portions 53 is not larger than the radius of the rotating portions 34 of the pivotal connection slots 32. The maximum distance between any one of the end points of the linear portion 54 and the curved portion 53 must be larger than the width L of the short side 332 of the sliding portion 33, such that the axles 52 can be inserted into the rotating portions 34 of the pivotal connection slots 32, respectively. Since the maximum distance between any one of the end points of the linear portion 54 and the curved portion 53 is larger than the width L of the short side 332 of the sliding portion 33, the axles 52 cannot rotate within the sliding portions 33. According to the present invention, the curved portion 53 is subtended by an angle larger than 180° to reinforce the structure of the axles 52.

Figure 3:
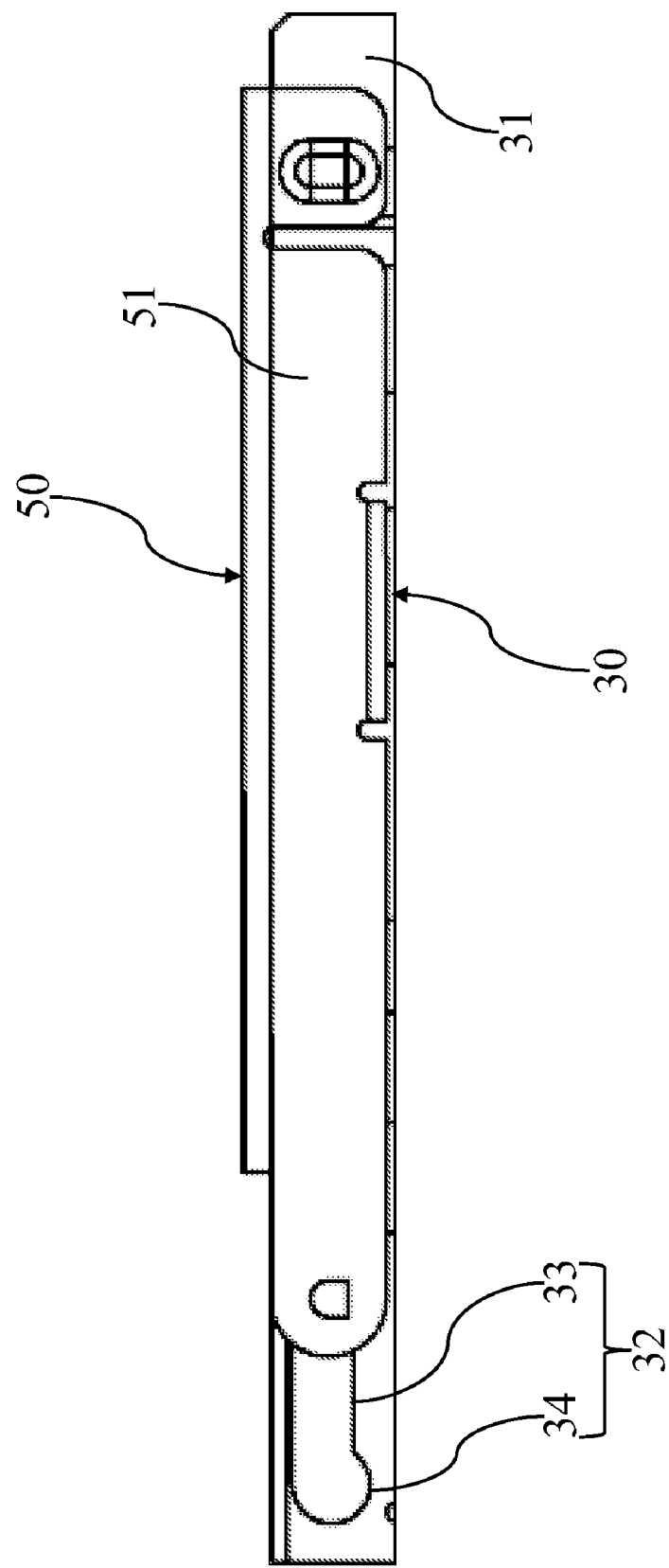
FIG. 3 is a side view of the electrical card connector in a locked state according to the first preferred embodiment of the present invention.
Figure 4:
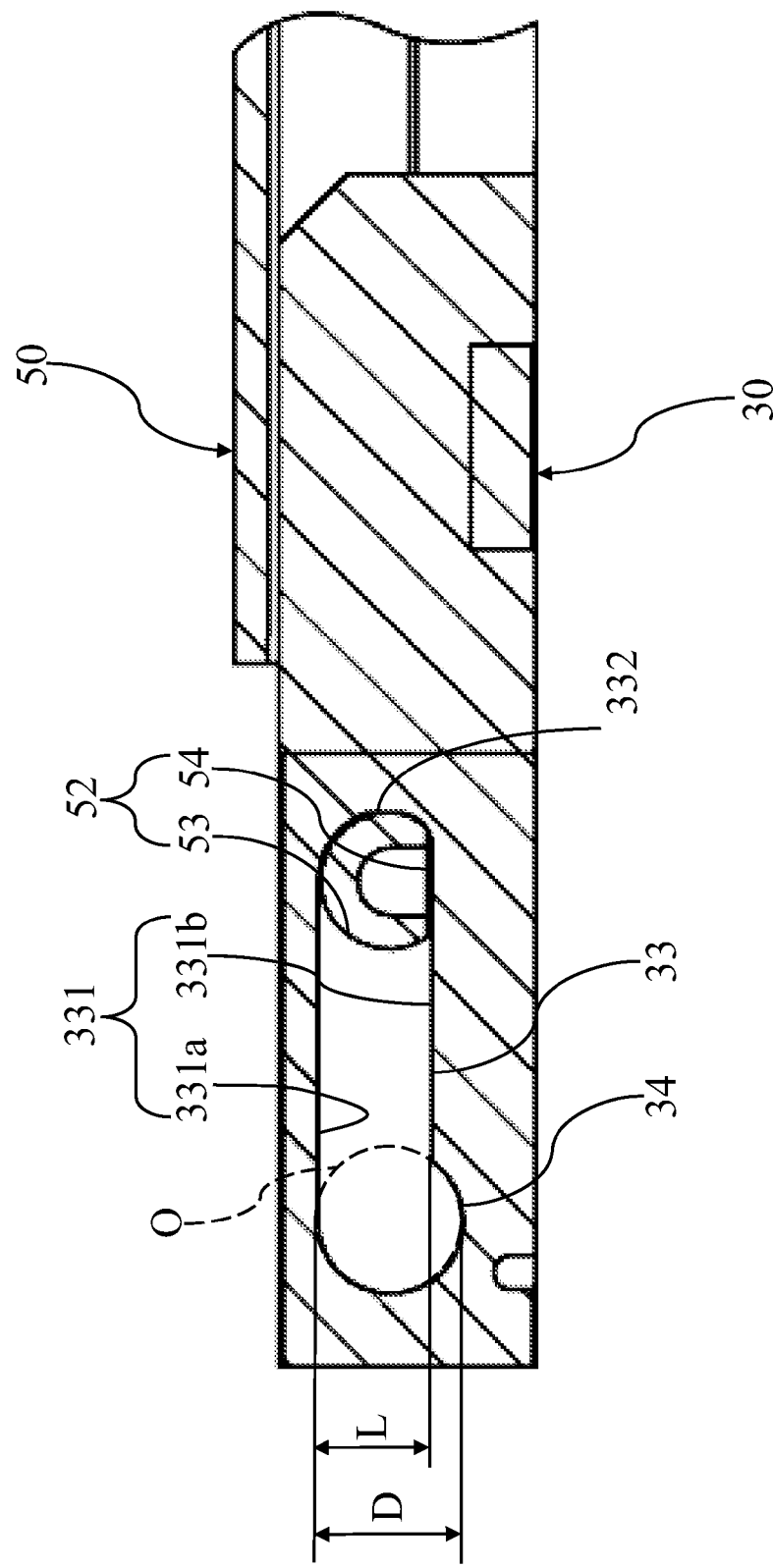
FIG. 4 is a partial cross-sectional view of the electrical card connector in FIG. 3 according to the first preferred embodiment of the present invention.
Figure 7:
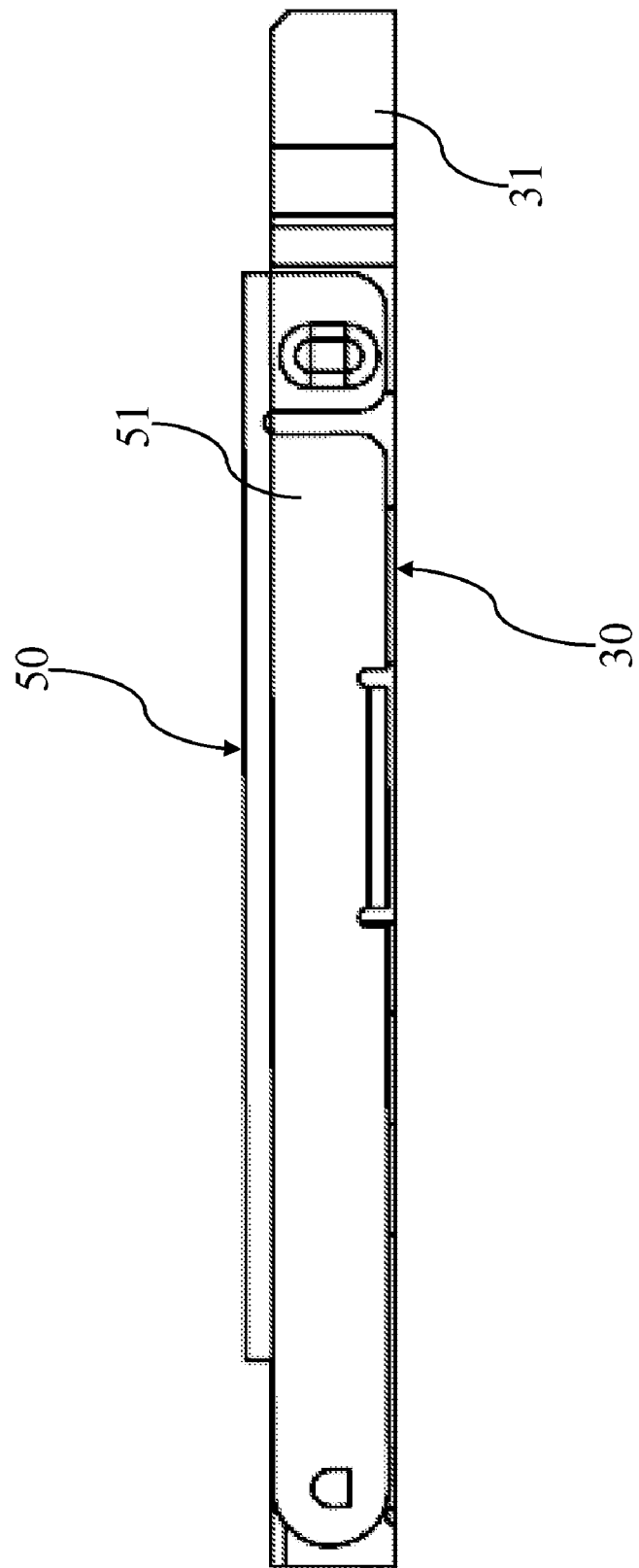
FIG. 7 is a side view of the electrical card connector in an unlocked state according to the first preferred embodiment of the present invention.
Figure 8:
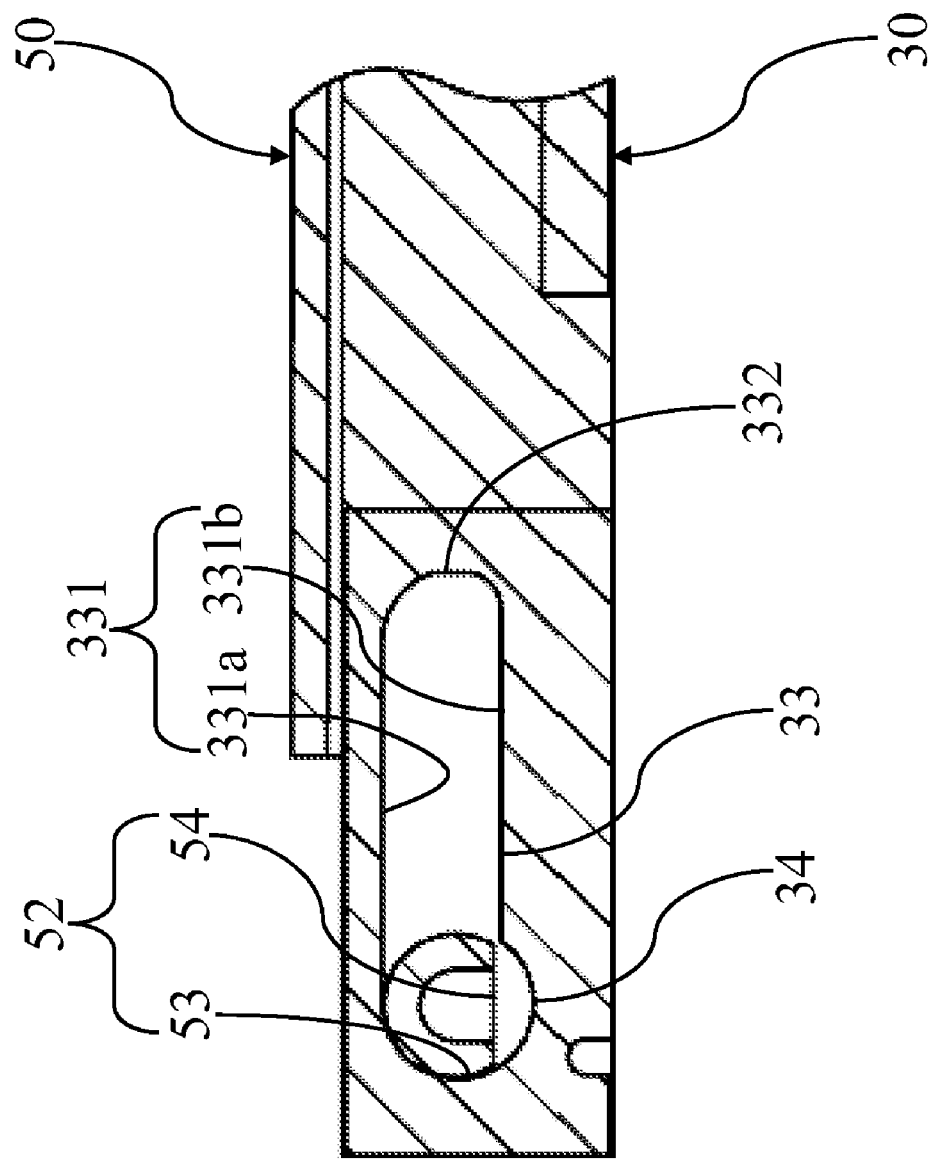
FIG. 8 is a partial cross-sectional view of the electrical card connector in FIG. 7 according to the first preferred embodiment of the present invention.

In practice, the axles 52 are inserted into the pivotal connection slots 32, respectively. Referring to FIG. 3 and FIG. 4, the axles 52 can slide within the sliding portions 33 of the pivotal connection slots 32, respectively; meanwhile, the cover 50 is in a locked state and thus cannot be opened by rotation. Referring to FIG. 7 and FIG. 8, the axles 52 can rotate within the rotating portions 34 of the pivotal connection slots 32, respectively; meanwhile, the cover 50 is in an unlocked state and thus can be opened, because the axles 52 can rotate within the rotating portion 34.

The unlocked state and the locked state of the electrical card connector 20 are described hereunder.

To lock the electrical card connector 20, a user exerts a force upon the cover 50 (see FIG. 3 and FIG. 4) to effectuate displacement of the cover 50 relative to the insulating body 30. After the axles 52 slide to the sliding portions 33 of the pivotal connection slots 32, the linear portions 54 of the axles 52 come into contact with the second long sides 331b of the sliding portions 33 through flat surfaces, respectively, and the axles 52 come into contact with the pivotal connection slots 32 through flat surfaces, respectively. Even though the curved portions 53 of the axles 52 come into contact with the first long sides 331a of the sliding portions 33 through curved surfaces, respectively, the cover 50 does not have opening room while sliding, because of a limit of the present invention in terms of dimensions. The axles 52 stop sliding as soon as the axles 52 abut against the short sides 332 at the ends of the sliding portions 33, respectively; meanwhile, the curved portion 53 and the short side 332 are in contact with each other through curved surfaces, whereas the linear portion 54 and the second long side 331b are in contact with each other through flat surfaces, such that the axles 52 are prevented from rotating within the sliding portions 33 of the pivotal connection slots 32. The cover 50 thus restrained is effective in abutting against the Micro SIM Card 10 to thereby effectuate efficient electrical connection between the Micro SIM Card 10 and the conductive terminals 40.

Figure 5:
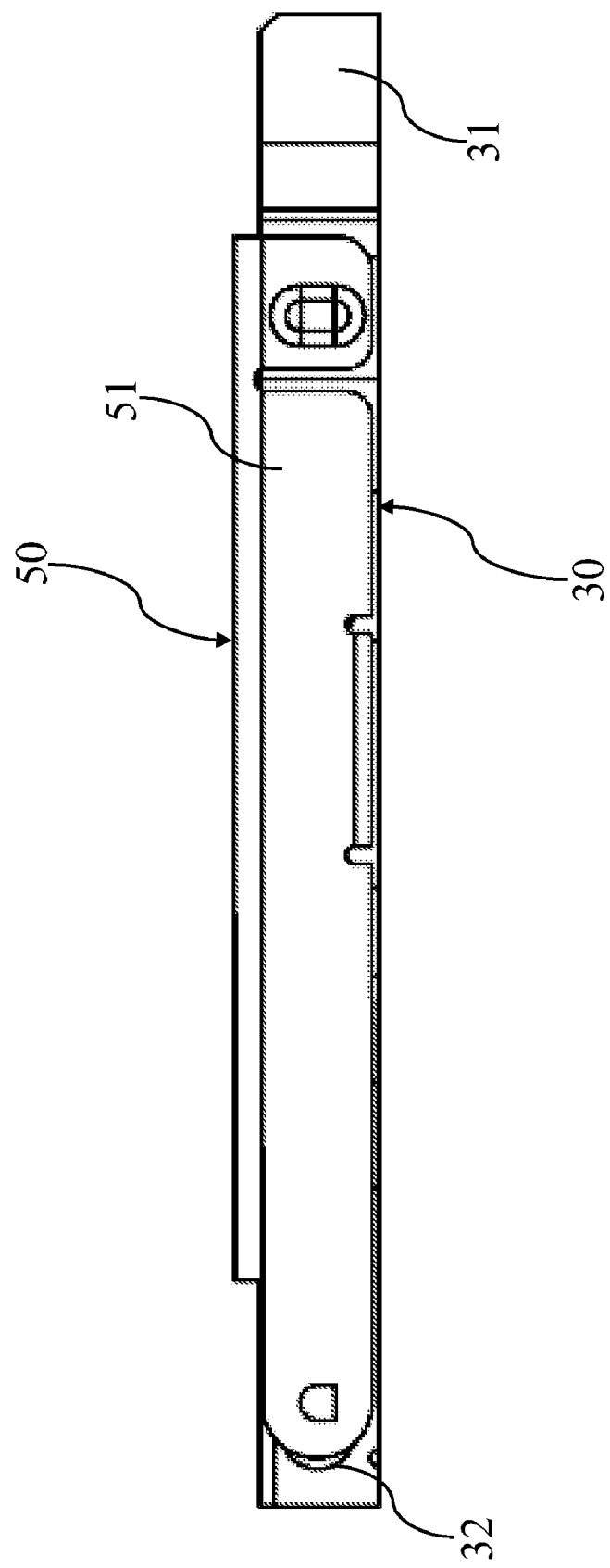
FIG. 5 is a side view of the electrical card connector which has switched from a locked state to an unlocked state according to the first preferred embodiment of the present invention.
Figure 6:
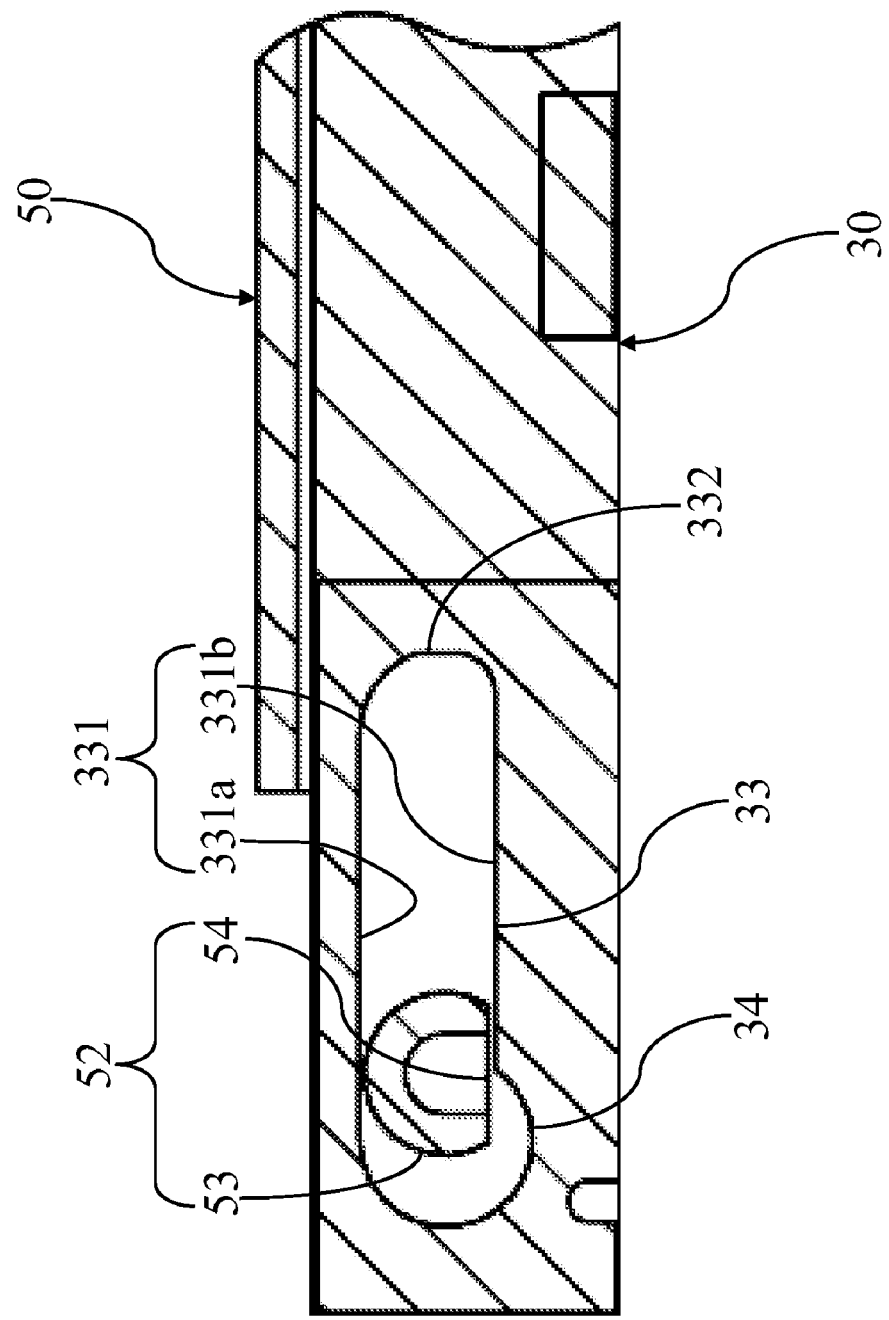
FIG. 6 is a partial cross-sectional view of the electrical card connector in FIG. 5 according to the first preferred embodiment of the present invention.
Figure 9:
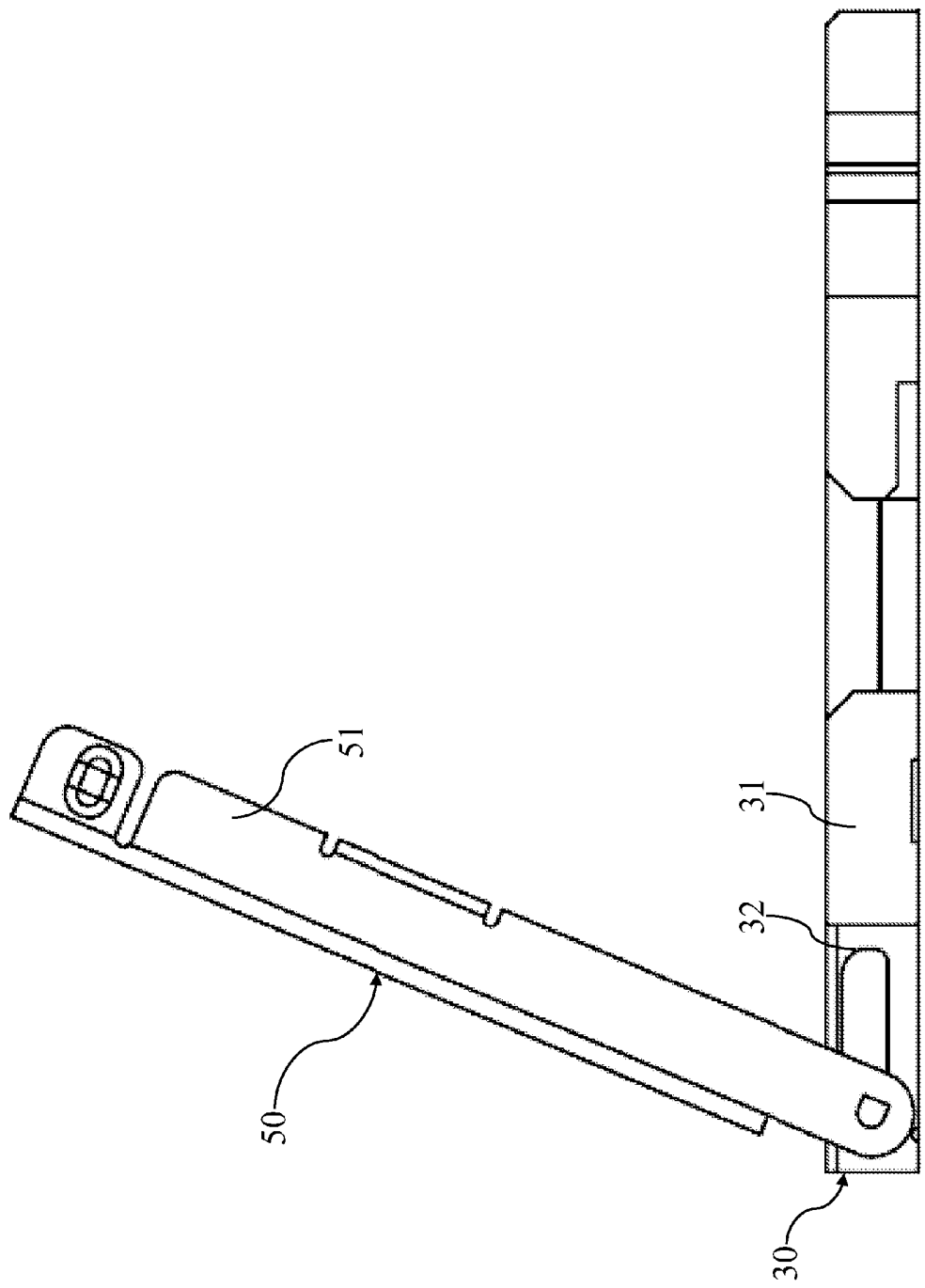
FIG. 9 is a side view of the electrical card connector in an opened state according to the first preferred embodiment of the present invention.
Figure 10:
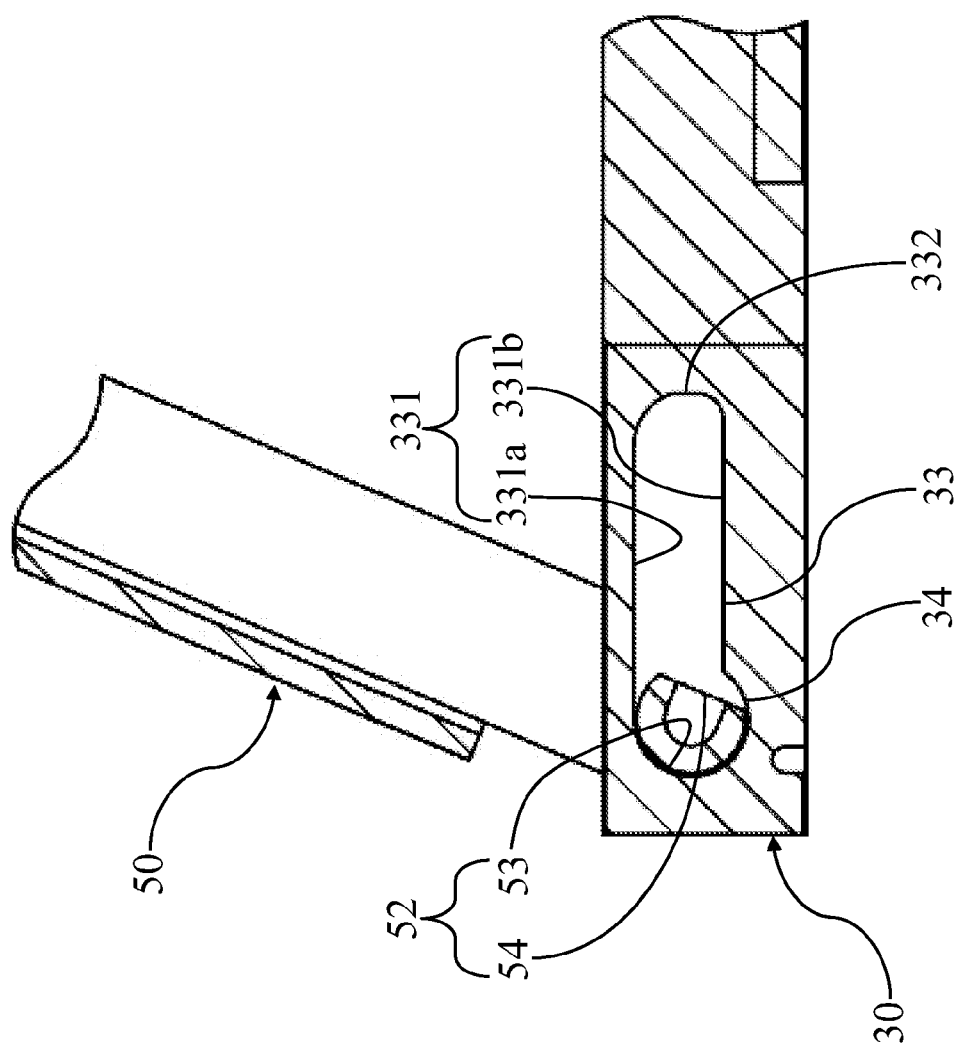
FIG. 10 is a partial cross-sectional view of the electrical card connector in FIG. 9 according to the first preferred embodiment of the present invention.

To unlock the electrical card connector 20, the user exerts a force upon the cover 50 to effectuate displacement of the cover 50 relative to the insulating body 30. After the axles 52 (see FIG. 5 and FIG. 6) slide to the rotating portions 34 of the pivotal connection slots 32 (see FIG. 7 and FIG. 8), the linear portions 54 of the axles 52 separate from the second long sides 331b of the sliding portions 33, such that the curved portions 53 of the axles 52 are inserted into the sliding portions 33 and eventually received in the rotating portions 34, respectively. The second long side 331b of the sliding portion 33 is tangentially connected to the circumference O of the rotating portion 34, such that the curved portion 53 can be continuously in contact with the sliding portion 33 or the rotating portion 34 of the pivotal connection slot 32, so as to enhance the stability of the cover 50 while the cover 50 is sliding. Finally, the curved portion 53 (see FIG. 9 and FIG. 10) and the rotating portion 34 come into contact with each other through a curved surface, so as to enhance the ease and stability of rotation of the axles 52, reduce vibration of the cover 50 so that the cover 50 can be steadily opened, prevent the axles 52 from being stretched to the detriment of the structural strength of the axles 52, and extend the service life of the electrical card connector 20.

The present invention is disclosed above by preferred embodiments. However, persons skilled in the art should understand that the preferred embodiments are illustrative of the present invention only, but should not be interpreted as restrictive of the scope of the present invention claimed. Persons skilled in the art should be able to understand and implement the aforesaid disclosure in the present invention. Hence, all equivalent changes or modifications made to the aforesaid embodiments without departing from the spirit embodied in the disclosure of the present invention should fall within the scope of the present invention.

What is claimed is:

1. An electrical card connector, comprising:
    an insulating body having two sides, wherein a pivotal connection slot is disposed at an end of each of two said sides of the insulating body and has a sliding portion and a rotating portion in communication with the sliding portion, the rotating portion being disposed at an end of the pivotal connection slot;
    a plurality of conductive terminals firmly held in the insulating body;
    a cover having two sides, wherein an axle protrudes from an end of each of two said sides of the cover and inserts into a corresponding one of the pivotal connection slots;
    characterized in that:
        the sliding portion and the rotating portion of each of the pivotal connection slots are an elongated hole and a round hole, respectively, a width of a short side of the sliding portion is less than a diameter of the rotating portion, and a long side of the sliding portion is tangentially connected to the circumference of the rotating portion;
        the axles each have a curved portion and a linear portion, wherein a maximum distance between a midpoint of the linear portion and the curved portion is less than the width of the short side of the sliding portion, and a radius of curvature of the curved portion is not larger than a radius of the rotating portion.

2. The electrical card connector of claim 1, wherein the maximum distance between the midpoint of the linear portion and the curved portion is larger than the width of the short side of the sliding portion.

3. The electrical card connector of claim 1, wherein the curved portion is subtended by an angle larger than 180°.

4. The electrical card connector of claim 1, wherein the short side is opposite to a point of communication between the sliding portion and the rotating portion, and the short side is of a curved shape.

* * * * *